Dec. 24, 1963 J. N. COATS 3,115,157
PIPE INTERCONNECTION ASSEMBLY
Filed May 1, 1961 4 Sheets—Sheet 1

INVENTOR.
JOHN N. COATS
BY
Buckhorn, Cheatham & Blore
ATTORNEYS

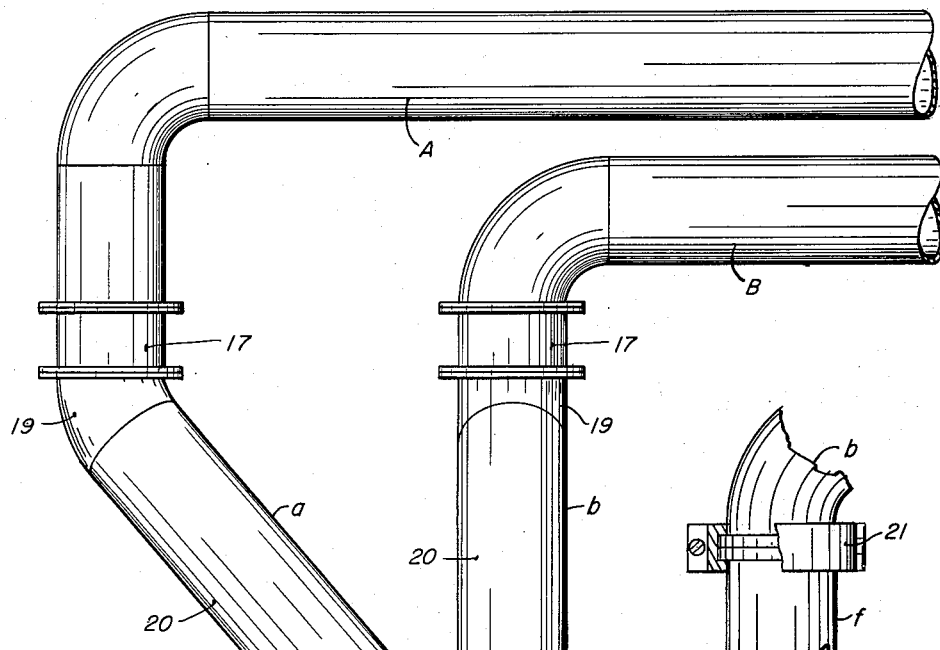
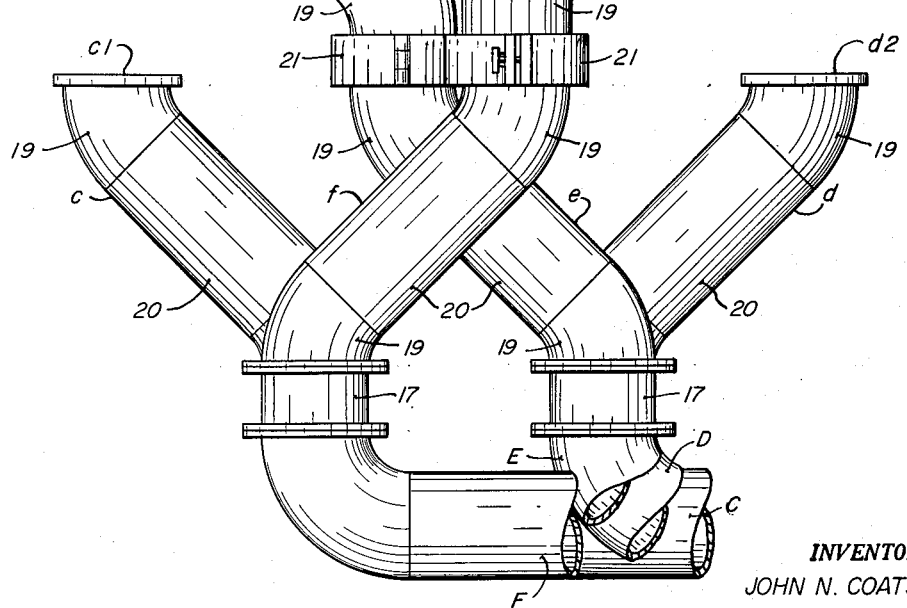
Fig. 4
Fig. 3
INVENTOR.
JOHN N. COATS
BY
Buckhorn, Cheatham & Blore
ATTORNEYS Dec. 24, 1963 J. N. COATS 3,115,157
PIPE INTERCONNECTION ASSEMBLY
Filed May 1, 1961 4 Sheets-Sheet 4

INVENTOR.
John N. Coats
BY
Buckhorn, Cheatham & Blore
ATTORNEYS 3,115,157
PIPE INTERCONNECTION ASSEMBLY
John N. Coats, 3574 SE. Clinton St., Portland 2, Oreg.
Filed May 1, 1961, Ser. No. 106,937
17 Claims. (Cl. 137—561)

This invention relates to pipe systems.

This application is co-pending with my prior application entitled "Pipe Inerconnection Assembly," Serial No. 9,977, filed February 19, 1960, now abandoned, and is a continuation-in-part thereof.

A main object of the invention is to provide a pipe system having a first series of pipes and a second series of pipes so located that swingable coupling units permit any pipe of the first series to be connected to any pipe of the second series, and concurrently permit any other pipe of the first series to be connected to any other pipe of the second series.

A further object of the invention is to provide such a system in which the coupling units comprise a first series of members for the first series of pipes and a second series of members for the second series of pipes, and wherein the pipes are stationary and the coupling members are swingable to positions to facilitate the interconnection of the pipes mentioned above.

Another object is to provide such a system in which the coupling units each comprise a pair of rigid pipe sections pivotally connected together and to the associated pipe to enable it to be connected to any pipe of the other series.

Various other objects of the invention will be apparent from the following description taken in connection with the accompanying drawings wherein:

FIG. 3 is an elevational view taken in the direction of the arrows 3—3 in FIG. 2;

FIG. 4 is an elevational view taken in the direction of the arrows 4—4 of FIG. 2;

Figure 1:
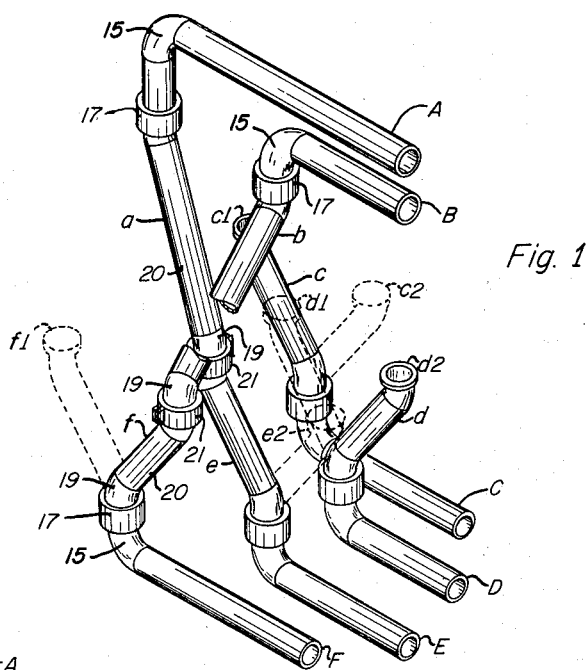
FIG. 1 is a diagrammatic perspective view of a pipe system of the present invention.
Figure 5:
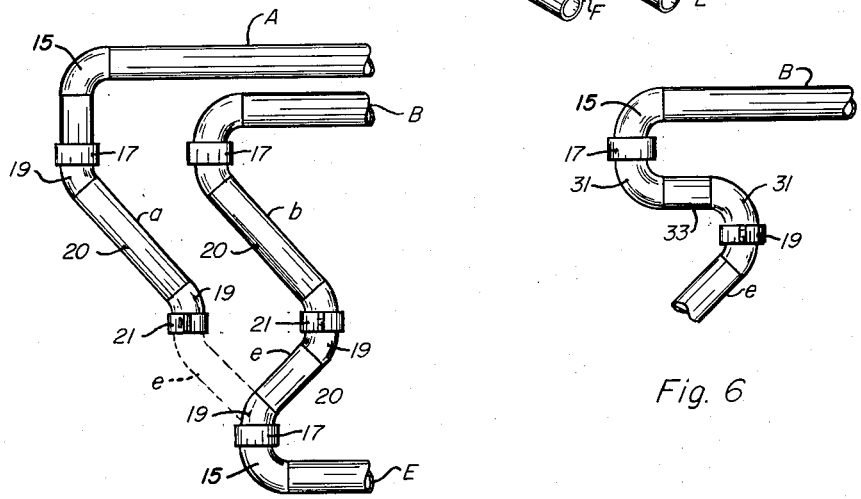
FIG. 5 is an elevational view illustrating how two pipes of one series can be connected to a single pipe of another series.

Referring to the drawings, the pipe system shown in FIGS. 1–6 includes a first series of stationary or fixed pipes which in the particular embodiment of the invention shown comprises two pipes A and B, and a second series of stationary or fixed pipes, which in the particular embodiment of the invention shown comprises four pipes C, D, E and F. The pipes are shown as having 90 degree elbows 15 so that the ends of the pipes face a plane extending between the pipe ends. Each of the pipes A, B, C, D, E and F has a swingable rigid coupling member, $a$, $b$, $c$, $d$, $e$, and $f$, respectively. The coupling members are coupled to their respective pipes by swivel joints 17 which may be of conventional construction. The coupling members are shown of angular form, and specifically each is shown as being made up of two 45 degree elbows 19 and a straight length of pipe 20. This means that the length of pipe extends at an angle of 45 degrees to the horizontal.

This angular formation of the coupling members means that the free end of a coupling member is offset laterally relative to the opposite end of the coupling member. Thus, by swinging a coupling member on its swivel joint, its free end may occupy different positions.

The free ends of the coupling members $a$ and $b$ are equiped with suitable coupling fittings 21 for connection to the free ends of the coupling members $c$, $d$, $e$ and $f$. For convenience, hereinafter the term "mouth" may be used to refer to an end of a coupling member, and the term "free mouth" will be used to refer to the bodily movable end of a coupling member usually a free end having an open mouth. The term "stationary mouth" will be used to designate the mouth of a coupling member which is bodily stationary although it may rotate or turn about its center.

Figure 2:
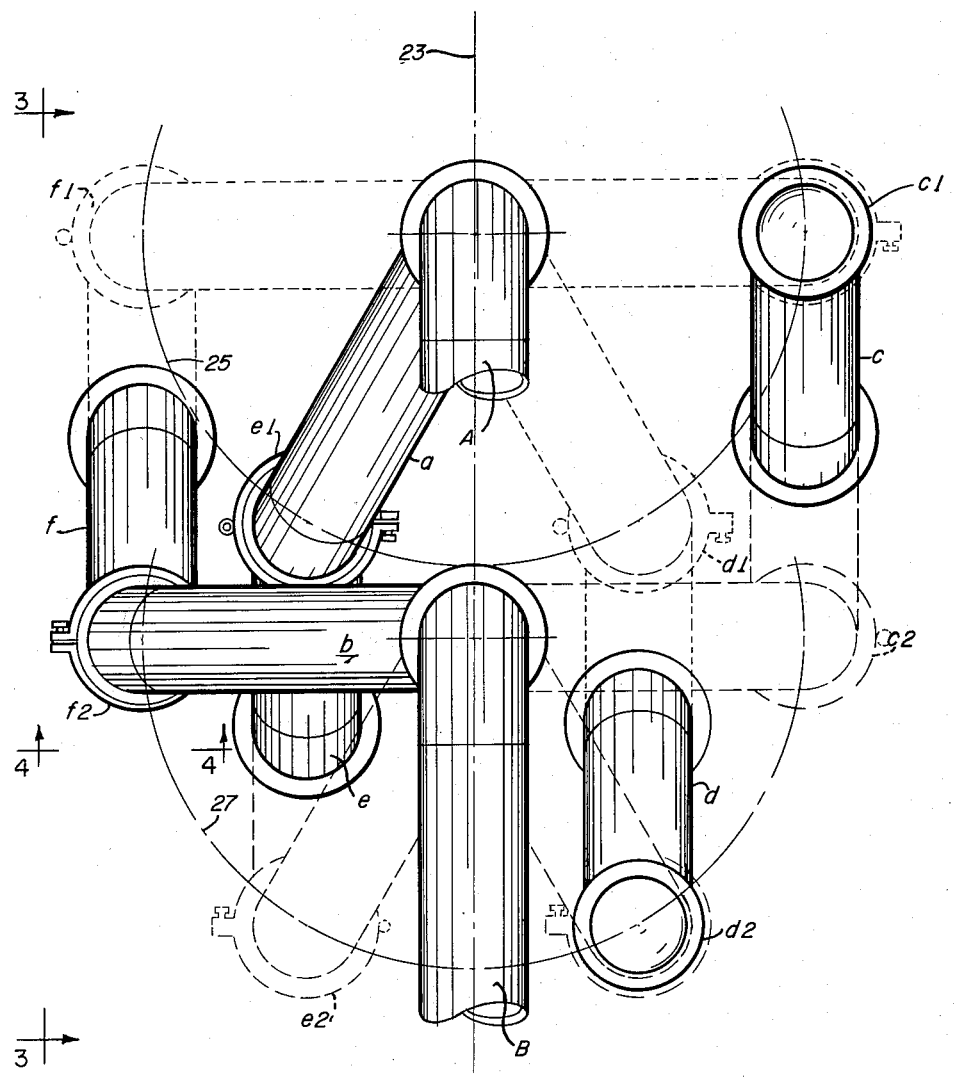
FIG. 2 is a plan view showing in full lines one method of interconnecting pipes, and indicating in dotted lines the manner of other interconnections.

Referring to FIG. 2, in the particular embodiment of the invention shown, the ends of the pipes A and B are located on a center line 23 in spaced relation with respect to one another. The free mouth of the coupling member $a$ is swingable along an arc 25, and the free mouth of the coupling member $b$ is swingable along an arc 27. The arcs are part of circles which have centers at the swivelly connected ends of the respective coupling members.

The free mouths of the coupling members $c$, $d$, $e$ and $f$ are swingable along circles which intersect circles 25 and 27 at points $c1$ and $c2$ for coupling member $c$, $d1$ and $d2$ for coupling member $d$, $e1$ and $e2$ for coupling member $e$, and $f1$ and $f2$ for coupling member $f$, as indicated in FIG. 2. This means that pipe A may be connected by means of the coupling members to any one of the pipes C, D, E or F at the points $c1$, $d1$, $e1$ or $f1$, and that pipe B may likewise be connected to any one of the pipes, C, D, E or F at $c2$, $d2$, $e2$ or $f2$. It is also obvious that if pipe A is connected by the associated coupling members to one of the pipes C, D, E or F, pipe B may be concurrently connected by the associated coupling members to any other of the pipes C, D, E or F.

It will be further noted that the coupling members are swingable to connect the pipes A and B to the pipes C, D, E and F without interference with one another.

In some instances, it may be necessary to swing a particular coupling in a particular direction to avoid contact with previously connected couplings. For instance, referring to FIG. 2, should the coupling members $a$ and $e$ be connected together, and it were desirable to swing the coupling member $f$ from the $f1$ position to the $f2$ position, it would have to be swung in a counterclockwise direction to avoid contact with the mouth of coupling member $e$. However, if coupling member $e$ is not connected to coupling member $a$ before coupling member $f$ is so swung, coupling member $f$ may be swung in a clockwise direction from the $f1$ position to the $f2$ position.

Figure 6:
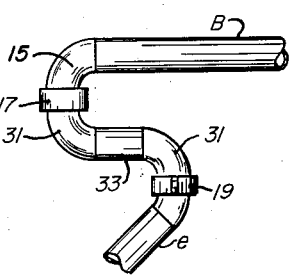
FIG. 6 is a modified form of the invention illustrating a modified form of coupling member.

FIG. 6 shows a modified form of the invention in which the coupling members are of different shape than that shown in FIGS. 1 through 5. More specifically, each coupling member in FIG. 6 comprises two 90 degree elbows 31 and a straight length of pipe 33. The coupling members may be otherwise variously formed as suits the construction methods of the manufacturer, it being pointed out that apart from systems designed to handle paper stock or similar fluids, the important feature is to locate one mouth of a coupling member in offset relation with respect to the other mouth of the coupling member in a direction parallel to the plane of a mouth.

While the specific embodiment of the invention shown includes two pipes in the first series and four pipes in the second series, it is apparent that more or less pipes may be utilized in either series. In other words, the particular form of the invention disclosed is merely typical of the way in which the concepts of the present invention may be utilized.

It is also pointed out that the present invention makes is possible to permanently connect the coupling members to their respective pipes, and this is contemplated. The connection of the coupling members to one another is by means of a detachable coupling fitting of any particular construction.

Figure 7:
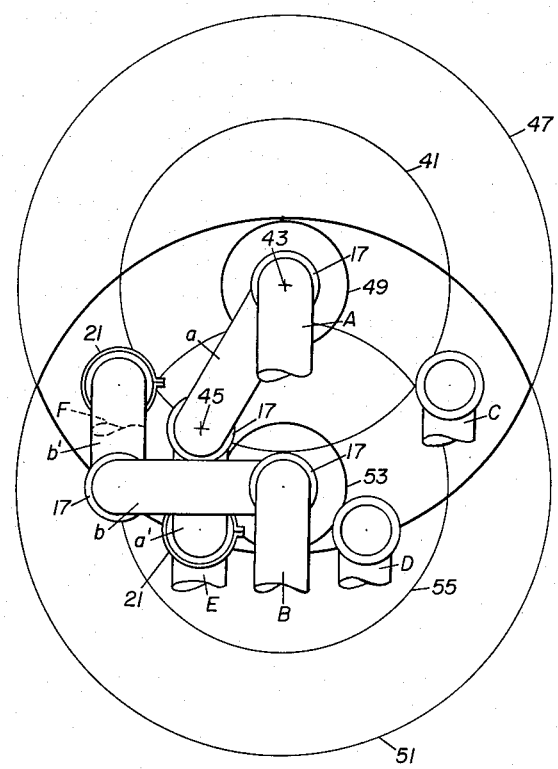
FIG. 7 is a somewhat diagrammatic view of another pipe system of my invention.

FIG. 7 shows another system of my invention which is similar to that shown in FIG. 2 except that there are two coupling members $a$ and $a'$ permanently associated with pipe A and two coupling members $b$ and $b'$ permanently associated with pipe B. Coupling member $a'$ is like coupling member $e$ of FIG. 2 except that the free end of coupling member $a'$ is pivotally connected by a swivel joint 17 to the adjacent end of coupling member $a$ instead of having a detachable connection with such member. Also, coupling member $a'$ has a free end detachably connected by a quick detach coupling 21 to the flanged mouth of pipe E rather than being connected by a swivel joint to such flanged mouth.

The coupling members $b$ and $b'$ having a similar relationship to one another and to pipe B.

It is apparent from FIG. 7 that coupling member $a'$ may be detached from pipe E and connected to any of the other pipes C, D or F by swinging the coupling members $a$ and $a'$ to appropriate positions. Coupling member $b'$ can similarly be connected to pipes C, D or E.

The mutual ranges of movement of the coupling members $a$ and $a'$ and $b$ and $b'$ are best appreciated by reference to the circles in FIG. 7. Circle 41 has its center at the center 43 of the stationary mouth of coupling member $a$, and has a radius equal to the offset distance between the centers 43 and 45 of the mouths of the coupling member $a$. For convenience, the term "offset length" will be used to designate this dimension of a coupling member.

Circle 47 is concentric with circle 41 and has a radius equal to the combined offset lengths of coupling members $a$ and $a'$. Circle 49 is concentric with circles 41 and 47 and has a radius equal to the offset length of coupling member $a$ minus the offset length of coupling member $a'$.

It is apparent that with circle 41 as a locus of centers, the axis of the free mouth of coupling member $a'$ can assume any position between circles 47 and 49.

For similar reasons, the axis of the free mouth of coupling member $b'$ can assume any position between circles 51 and 53 with a circle 55 as a locus of centers. It follows that the axes of the free ends of coupling members $a'$ and $b'$ can mutually assume any positions within the zone overlapped by the bands defined by circles 47 and 49 and 51 and 53. This zone of overlap is outlined by heavy portions of the circles 47 and 51, less the areas of circles 49 and 53. It is evident that the flanged mouths of pipes C, D, E and F are located within this zone of overlap. While the centers of such flanged mouths are shown located on the arc of a single circle, they could be otherwise located in many other positions within the zone of overlap.

Figure 8:
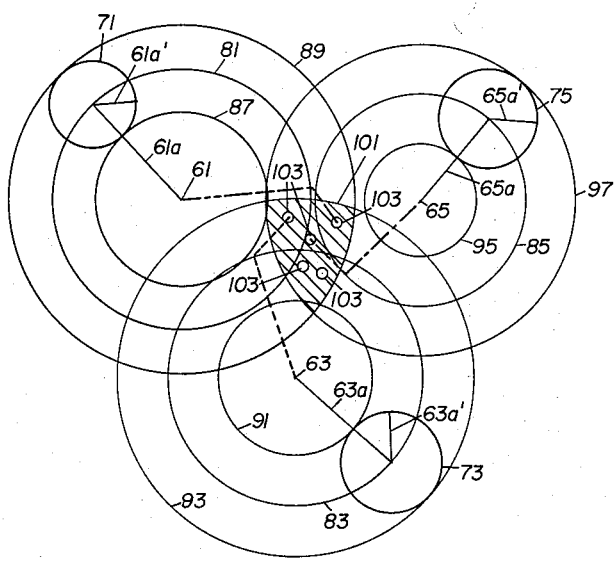
FIG. 8 is a diagrammatic view to show the relationship of various parts of my systems.

FIG. 8 shows a system with three inlet pipes having mouth centers at 61, 63 and 65. The coupling members for pipes 61, 63 and 65 are shown by heavy lines $61a$ and $61a'$, $63a$ and $63a'$, and $65a$ and $65a'$, respectively.

The small circles 71, 73 and 75 indicate the ranges of movement of the centers of the free mouth of members $61a'$, $63a'$ and $65a'$, respectively, about one center each on circles 81, 83 and 85, respectively, which are of locuses of centers respectively for the coupling members $61a'$, $63a'$ and $65a'$. Circles 87 and 89 establish the band of possible locations of the center of the free mouth of member $61a'$. Circles 91 and 93 establish a similar band for member $63a'$, and circles 95 and 97 establish a similar band for member $65a'$.

The zone 101 of mutual overlap is shaded, and a number of outlet pipe mouths are shown and numbered 103. Other connections are obvious.

In any system, the specific length, spacing and location of the various coupling members should be made to avoid interference between the coupling members in any connected positions thereof.

In FIGS. 7 and 8 any pair of coupling members may be considered as a tubular coupling unit. In FIG. 2, members $a$ and $e$ may be considered a coupling unit and and $f$ as a coupling unit, when connected as shown. Thus $a$ and $b$ form coupling units with various of the members $c$, $d$, $e$ and $f$.

It is pointed out that for handling paper stock, the angle of a coupling member with the horizontal cannot be substantially less than 45 degrees or the fibers will tend to settle out, to cause the usual difficulties known to those skilled in the art. Applicant has provided a very compact arrangement in which the coupling members are not substantially less than 45 degrees.

The terms "inlet" and "outlet" used above are meant to be illustrative, not limiting.

While the term pipe has been utilized throughout the description, it is apparent that the invention is suitable for use with any sort of rigid hollow conducting member, such as a conduit, passageway, tube or the like. For convenience in the claims, the term conduit will be utilized to apply to any of such conducting members.

Having described the invention in what is considered to be the preferred embodiment thereof, it is desired that it be understood that the invention is not to be limited other than by the provisions of the following claims.

I claim:

1. A conduit system comprising a series of first conduits having a set of parallel ends, a series of second conduits having a set of ends which are parallel to one another and to the ends of the first conduits, means for connecting the ends of the first conduits selectively and individually to the ends of the second conduits including a tubular coupling unit extending between each first conduit end and a second conduit end, each tubular coupling unit including first and second rigid tubular members each having parallel offset ends, said connecting means connecting said coupling units to the ends between which they extend and also connecting the members of each unit together and providing for adjustment of the positions of each tubular member relative to the ports to which it is connected to provide for selective connection of the first conduits to the second conduits.

2. A conduit system comprising a series of first conduits having a set of parallel ends, a series of second conduits having a set of ends which are parallel to one another and to the ends of the first conduits, the ends of the first and second conduits being in fixed positions, means for connecting the ends of the first conduits selectively and individually to the ends of the second conduits including a tubular coupling unit extending between each first conduit end and a second conduit end, each coupling unit being movable independently of the other coupling units, each coupling unit including first and second rigid tubular members each having offset ends which are parallel to one another and to the ends of said conduits, said connecting means connecting said coupling units to the ends between which they extend and also connecting the members of each unit together and providing for adjustment of the position of each tubular member relative to the parts to which it is connected to provide for selective connection of the first conduits to the second conduits.

3. A conduits system comprising a series of first conduits having a set of parallel ends, a series of second conduits having a set of ends which are parallel to one another and to the ends of the first conduits, means for connecting the ends of the first conduits selectively and individually to the ends of the second conduits including a tubular coupling unit extending between each first conduit end and a second conduit end, each tubular coupling unit including first and second rigid tubular members each having parallel offset ends, said connecting means connecting said coupling units to the ends between which they extend and also connecting the members of each unit together and providing for adjustment of the positions of each tubular member relative to the ports to which it is connected to provide for selective connection of the first conduits to the second conduits, the ends of the first conduits being so located that circles concentric with the centers of the ends of the first conduits and having radiuses equal to the offset lengths of the associated tubular units overlap one another to define a zone in which the ends of the second conduits are located, said connecting means and the relative location and spacing of said conduits providing for the connection of any one of said ends of said first conduits to any one of said ends of said second conduits and for the concurrent connection of the remainder of said ends of said first conduits to at least certain of the remainder of said ends of said second conduits.

4. A conduit system comprising a series of first conduits having a set of parallel ends, a series of second conduits having a set of ends which are parallel to one another and to the ends of the first conduits, means for connecting the ends of the first conduits selectively and individually to the ends of the second conduits including a tubular coupling unit extending between each first conduit end and a second conduit end, each tubular coupling unit including first and second rigid tubular members each having parallel offset ends, said connecting means connecting said coupling units to the ends between which they extend and also connecting the members of each unit together and providing for adjustment of the positions of each tubular member relative to the parts to which it is connected to provide for selective connection of the first conduits to the second conduits, the connections provided by said connecting means including a pivotal connection for each of two ends of the members of each coupling unit and a detachable connection for the remaining ends, the ends of the first conduits being so located that circles concentric with the centers of the ends of the first conduits and having radiuses equal to the offset lengths of the associated tubular units overlap one another to define a zone in which the ends of the second conduits are located.

5. A conduit system comprising a series of first conduits having a set of parallel ends, a series of second conduits having a set of ends which are parallel to one another and to the ends of the first conduits, means for connecting the ends of the first conduits selectively and individually to the ends of the second conduits including a tubular coupling unit extending between each first conduit end and a second conduit end, each tubular coupling unit including first and second rigid tubular members each having parallel offset ends, said connecting means connecting said coupling units to the ends between which they extend and also connecting the members of each unit together and providing for adjustment of the positions of each tubular member relative to the parts to which it is connected to provide for selective connection of the first conduits to the second conduits, the connections provided by said connecting means including a pivotal connection for each of two ends of the members of each coupling unit and a detachable connection for the remaining ends, said remaining ends being located in a common plane, the ends of the first conduits being so located that circles concentric with the centers of the ends of the first conduits and having radiuses equal to the offset lengths of the associated tubular units overlap one another to define a zone in which the ends of the second conduits are located.

6. A conduit system comprising a series of first conduits having a set of parallel ends, a series of second conduits having a set of ends which are parallel to one another and to the ends of the first conduits, means for connecting the ends of the first conduits selectively and individually to the ends of the second conduits including a tubular coupling unit extending between each first conduit end and a second conduit end, each tubular coupling unit including first and second rigid tubular members each having parallel offset ends, the tubular members of each unit being connected together for relative pivotal movement about an axis perpendicular to the planes of the ends of such members, one end of each unit being connected to an end of a first conduit for pivotal movement about an axis perpendicular to the plane which is parallel to the ends of the tubular members, and means for detachably connecting the free ends of the units to any of the ends of the second conduits, the ends of the first conduits being so located that circles concentric with the centers of the ends of the first conduits and having radiuses equal to the offset lengths of the associated tubular unit overlap one another to define a zone in which the ends of the second conduits are located.

7. A conduit system comprising a first series of conduits, a second series of conduits and means providing for connection of any of the conduits of the first series with any of the conduits of the second series, said means including a swingable coupling member for each conduit having a free end movable in a predetermined arc, the arc of the coupling member of each conduit of the first series intersecting the arc of the coupling member of each conduit of the second series.

8. A conduit system comprising a series of first conduits, each having pivotally connected thereto a tubular connecting member having a free end movable along a predetermined arc, and a series of second conduits each having pivotally connected thereto a tubular connecting member having a free end movable through an arc intersecting the arcs of the first conduits so that any tubular connecting member of the first conduits can be connected to any tubular connecting member of the second conduits.

9. A conduit system comprising a series of first conduits, each having pivotally connected thereto a tubular connecting member having a free end movable along a predetermined circle, a series of second conduits each having pivotally connected thereto a tubular connecting member having a free end movable through an arc intersecting the circles of the first conduits so that any tubular connecting member of the first conduits can be connected to any tubular connecting member of the second conduits, and means for detachably connecting the free ends of the tubular members at the points of intersection.

10. A conduit system comprising a series of first conduits, each having pivotally connected thereto a tubular connecting member having a free end movable along a predetermined circle, and a series of second conduits each having pivotally connected thereto a tubular connecting member having a free end movable through an arc intersecting the circles of the first conduits so that any tubular connecting member of the first conduits can be connected to any tubular connecting member of the second conduits, said arcs and circles lying in parallel planes.

11. A conduit system comprising a series of first conduits, each having pivotally connected thereto a tubular connecting member having a free end movable along a predetermined circle, and a series of second conduits each having pivotally connected thereto a tubular connecting member having a free end movable through an arc intersecting the circles of the first conduits so that any tubular connecting member of the first conduits can be connected to any tubular connecting member of the second conduits, the tubular members for the first conduits being of equal length, and the tubular members for the second conduits being of equal length.

12. A conduit system comprising a series of first conduits, each having pivotally connected thereto a tubular connecting member having a free end movable along a predetermined circle, and a series of second conduits each having pivotally connected thereto a tubular connecting member having a free end movable through an arc intersecting the circles of the first conduits so that any tubular connecting member of the first conduits can be connected to any tubular connecting member of the second conduits, the tubular members for the first conduits being longer than the tubular members for the second conduits.

13. A conduit system comprising a series of first conduits, each having pivotally connected thereto a tubular connecting member having a free end offset from the pivotal axis of such tubular member and movable along a predetermined circle upon pivotal movement of such tubular member, and a series of second conduits each having pivotally connected thereto a tubular connecting member having a free end offset from the pivotal axis of such tubular member and movable upon pivotal movement of such tubular member along an arc intersecting the circles of said first conduits so that any tubular member of the first conduits can be connected to any tubular member of the second conduits.

14. A conduit system comprising a series of first conduits having a set of ends in a common plane, a series of second conduits having a set of ends in a common plane spaced from but parallel to said first plane, and a single rigid tubular member for each conduit, each tubular member being connected to the mentioned end of its conduit for pivotal movement about an axis perpendicular to said planes, each tubular member having the end remote from its conduit offset from its pivotal axis, said conduit ends being so located and said tubular members being so dimensioned that the tubular members of the first conduits may be simultaneously connected to any different tubular members of said second conduits.

15. A conduit system comprising a series of first conduits having a set of ends in a common plane, a series of second conduits having a set of ends in a common plane spaced from but parallel to said first plane, means for connecting the ends of the first conduits selectively and individually to the ends of said second conduits including a tubular conduit unit extending between each first conduit end and a second conduit end, each tubular conduit unit including first and second tubular members each having parallel offset ends, said connecting means connecting said coupling units to the ends between which they extend and also connecting the members of each unit together and providing for adjustment in the position of each tubular member relative to the parts to which it is connected to provide for selective connection of the first conduits to the second conduits.

16. An apparatus of the class described comprising a first set of rigid tubular members and a second set of rigid tubular members, each tubular member having parallel offset ends, means swively mounting the first set of members by one end of each and so that the other ends move in a common plane, means swively mounting the second set of members by one set of ends and so that the other ends move in a common plane which is next to the first mentioned common plane, the swively mounted ends of said second set of members being remotely located relative to the swively mounted ends of the first set of members, the members being so located that when viewed from a direction normal to said planes the arc described by said other end of each member of the first set intersects the arc described by said other end of each member of the second set to provide for flow from any member of the first set to any member of the second set, and means for detachably connecting together pairs of said other ends of said members at times when such ends are arranged in opposed relationship.

17. A conduit system comprising a series of fixed first conduits having a set of parellel ends, a series of fixed second conduits having a set of ends which are parallel to one another and to the ends of the first conduits, means for connecting the ends of the first conduits selectively and individually to the ends of the second conduits including a tubular coupling unit extending between each first conduit end and a second conduit end, each tubular coupling unit including first and second rigid tubular members each having parallel offset ends, said connecting means connecting said coupling units to the ends between which they extend and also connecting the members of each unit together and providing for adjustment of the positions of each tubular member relative to the ports to which it is connected to provide for selective connection of the first conduits to the second conduits, the ends of the first conduits being so located that circles concentric with the centers of the ends of the first conduits and having radiuses equal to the offset lengths of the associated tubular units overlap one another to define a zone in which the ends of the second conduits are located.

References Cited in the file of this patent

UNITED STATES PATENTS

| | | |
|---|---|---|
| 2,043,856 | Knapp | June 9, 1936 |
| 2,448,933 | Thomas | Sept. 7, 1948 |

UNITED STATES PATENT OFFICE
CERTIFICATE OF CORRECTION

Patent No. 3,115,157                  December 24, 1963

John N. Coats

It is hereby certified that error appears in the above numbered patent requiring correction and that the said Letters Patent should read as corrected below.

Column 4, line 5, after "and", second occurrence, insert -- b --, in italics; column 4, line 42, column 5, line 3, and column 8, line 31, for "ports", each occurrence, read -- parts --.

Signed and sealed this 5th day of May 1964.

(SEAL)
Attest:

ERNEST W. SWIDER
Attesting Officer

EDWARD J. BRENNER
Commissioner of Patents